Jan. 9, 1923.
O. BÖSSNER.
LINK BELT.
FILED FEB. 28, 1922.
1,441,556.
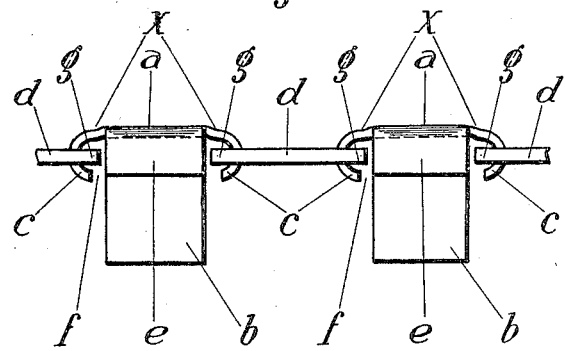
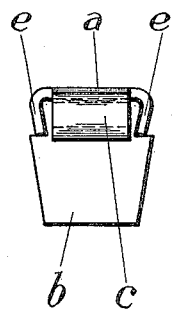
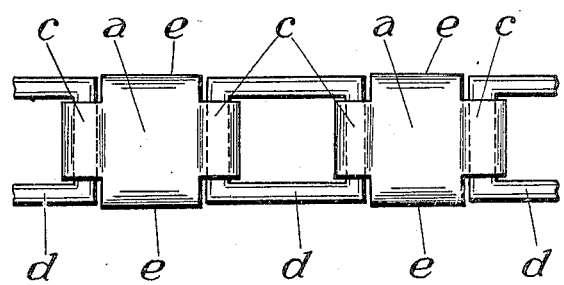
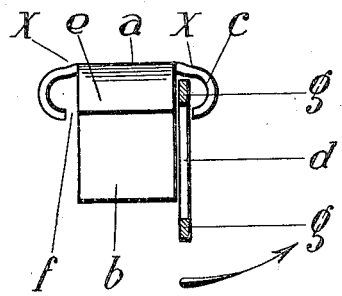
Inventor Patented Jan. 9, 1923.

1,441,556

UNITED STATES PATENT OFFICE.

OTTO BÖSSNER, OF MUNICH, GERMANY.

LINK BELT.

Application filed February 28, 1922. Serial No. 540,023.

*To all whom it may concern:*

Be it known that I, OTTO BÖSSNER, a citizen of Germany, and residing at Munich, Bavaria, Germany, have invented certain new and useful Improvements in Link Belts, of which the following is a specification.

This invention relates to link belts such as are used for the transmission of power from engine pulleys and its purpose is to provide a strong and effective belt of the aforesaid kind which can be cheaply produced and quickly assembled and disassembled without the employment of any tool.

The belt, according to my invention, consists of a number of friction members anchored within suitably shaped metal links which are interconnected by means of open links or eyes. The links carrying the friction members and which are hereinafter called friction links are provided with lugs extending longitudinally and laterally to the direction of pull; the friction members being recessed and tightly clamped by the bent up side lugs, whereas the longitudinal lugs are bent into the shape of hooks of which the entrances to the eye receiving slots are narrower than the end members of the connecting links or eyes. This mode of fixing the friction members results in that the latter are not subjected to the pull on the belt, and it also enables a quick assembling and disassembling of the links without the use of any tool, simply by turning the connecting eyes relative to the friction links through 90° out of the direction of the belt. Thus it is impossible for the links to ever become disconnected of their own accord.

My invention is shown in the accompanying drawings illustrating the improved links by way of example.

Fig. 1 is a side elevation of two successive links and interconnecting eyes,

Fig. 2 is a plan view of same,

Fig. 3 is an end view of one of the friction members,

Fig. 4 illustrates the mutual position of the two parts during the act of connecting or disconnecting.

The belt, according to these drawings, consists of the links $a$ in which the friction blocks $b$ are received and which terminate into hook portions $c$, and of links or eyes $d$, interconnecting each two of the aforesaid friction links. The links $a$ are preferably stamped out of sheet steel and provided with two sets of lugs. Two of these lugs extend longitudinally in the direction of the belt and are bent into the shape of the hooks $c$ mentioned above, whereas the other two lugs $e$ extend in a direction normal to the belt and are bent downwardly to form shoes adapted to be pressed firmly into the dovetail recesses at the foot of the friction blocks $b$ and to thereby secure the latter against movement within the link member. The blocks $b$ are preferably made of vulcan fibre, wood fibre, leather or similar material. When used for the transmission of power from wedge groove pulleys the friction blocks $b$ should be of such width, as measured across the lugs $e$, as to enable the link members $a$ to lie properly embedded between the walls of the V-groove. The lugs $c$ extending longitudinally in the direction of the belt may be slightly depressed at both sides of the friction block, as shown at $x$, for the purpose of preventing a lengthwise displacement of the block. They are bent into hooks of which the entrance $f$ to the slots is narrower than the width of the end members $g$ of the connecting links $d$ which are to be received within the said slots. Said connecting links are also preferably stamped out of sheet steel in a shape resembling a closed rectangular or other figure. The thickness of the end members $g$ is somewhat less than the width of the hook opening $f$, so that each connecting link $d$ can be inserted into a hook $c$ in an upright position only, i. e., when turned 90° out of the plane of the belt. Fig. 4 clearly shows the position of the parts at this moment. The bend of the hook, however, is sufficiently wide for the end member $g$ to be turned therein.

It will be seen, that when the assembled belt is stretched, as is the case when the belt is in use, a separation of the links is impossible because of the end members $g$ being then unable to pass through the hook members $f$ and because of the impossibility for the links to automatically take the angular position shown in Fig. 4. On the other hand, however, my improved construction enables the assembling and disassembling of the links without the employment, for the purpose, of any tool whatever in a most convenient manner and after the style which has already been proposed in connection with a certain type of gear driven chain.

What I claim is:—

1. A link belt comprising a number of friction links and connecting links, said friction links terminating into longitudinally and laterally extending lugs of which the former are bent into hooks, and a recessed block received and held between the bent up lateral lugs.

2. In a link belt consisting of interconnected friction links, laterally extending lugs bent up to form a shoe for the reception of a recessed block member, longitudinally extending lugs bent into hooks in which the entrance to the hook opening is narrower than the opening itself, connecting links to connect each two of said friction links and having end members of a width greater than that of the entrance to the said hook openings.

3. In a link belt, a number of friction links, dove-tailed block members anchored within laterally extending lugs of said friction links, connecting links to connect each two friction links and consisting of side and end members, and longitudinal lugs extending from the body of each of said friction links and bent into hooks of which the entrance openings are narrower than the width of the connecting link end members, but wider than the thickness of same.

4. In a link belt, a number of friction links interconnected by a number of connecting links, lateral lugs on each of said friction links bent up to clamp a recessed block member between them, longitudinal lugs on said links bent into hooks and depressed out of the plane of the said links to assist in holding the block member, side and end members to the said connecting links of which the end members are of a width greater than that of the openings leading into the hooks of the friction members.

In testimony whereof I affix my signature.

OTTO BÖSSNER.